United States Patent
Kurtz

(10) Patent No.: US 10,329,997 B2
(45) Date of Patent: Jun. 25, 2019

(54) DIESEL ENGINE WITH DUAL FUEL INJECTION

(71) Applicant: Ford Global Technologies, LLC, Dearborn, MI (US)

(72) Inventor: Eric Matthew Kurtz, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/654,471

(22) Filed: Jul. 19, 2017

(65) Prior Publication Data

US 2019/0024572 A1 Jan. 24, 2019

(51) Int. Cl.
| F02B 23/06 | (2006.01) |
| F02D 41/30 | (2006.01) |
| F02D 41/40 | (2006.01) |
| F02B 7/04  | (2006.01) |

(52) U.S. Cl.
CPC ............ F02B 23/0663 (2013.01); F02B 7/04 (2013.01); F02D 41/3094 (2013.01); F02D 41/403 (2013.01); F02B 2275/14 (2013.01)

(58) Field of Classification Search
CPC .................................................... F02B 75/18
USPC ............... 123/50 R, 50 A, 50 B, 51 R, 51 A, 123/51 AA, 51 B, 51 BA, 51 BC
See application file for complete search history.

(56) References Cited

U.S. PATENT DOCUMENTS

| 4,416,229 | A | 11/1983 | Wood |
| 7,270,108 | B2 | 9/2007 | Lemke |
| 8,800,528 | B2 | 8/2014 | Fuqua et al. |
| 8,820,294 | B2 | 9/2014 | Fuqua et al. |
| 8,997,710 | B2 | 4/2015 | Herold et al. |
| 9,032,927 | B1 | 5/2015 | Redon |
| 9,211,797 | B2 | 12/2015 | Abani et al. |
| 9,309,807 | B2 | 4/2016 | Burton et al. |
| 2003/0015599 | A1* | 1/2003 | Carroll, III .......... F02M 45/086 239/88 |
| 2005/0198900 | A1* | 9/2005 | Nashburn ............... C01B 3/386 48/198.7 |
| 2006/0174624 | A1* | 8/2006 | Grabowski .............. B60K 6/40 60/709 |
| 2007/0119413 | A1 | 5/2007 | Lewis et al. |
| 2007/0119421 | A1 | 5/2007 | Lewis et al. |
| 2009/0217647 | A1* | 9/2009 | Daneau ................. F01N 3/0253 60/286 |
| 2010/0051728 | A1* | 3/2010 | Hicks ...................... F23D 11/38 239/597 |
| 2010/0288227 | A1* | 11/2010 | Baxter ................ F02B 23/0636 123/299 |

(Continued)

OTHER PUBLICATIONS

Kurtz, E. et al., Diesel Engine Dual Fuel Injection Strategy, U.S. Appl. No. 15/654,359, filed Jul. 19, 2017, 62 pages.

*Primary Examiner* — John Kwon
(74) *Attorney, Agent, or Firm* — Julia Voutyras; McCoy Russell LLP

(57) ABSTRACT

Methods and systems for supplying fuel to a diesel engine during a cycle of a cylinder are described. In one example, a cylinder is supplied fuel via two fuel injectors having different fuel flow rates. The two fuel injectors may be arranged opposed to each other or in a way that fuel spray from one injector intersects and collides with fuel spray from the other injector.

14 Claims, 9 Drawing Sheets

(56) References Cited

U.S. PATENT DOCUMENTS

| | | | |
|---|---|---|---|
| 2011/0315118 A1* | 12/2011 | Coldren | F02M 53/043 |
| | | | 123/456 |
| 2012/0143477 A1* | 6/2012 | Ruona | F02D 35/024 |
| | | | 701/103 |
| 2012/0291439 A1* | 11/2012 | Oskam | F23R 3/286 |
| | | | 60/737 |
| 2012/0291444 A1* | 11/2012 | Oskam | F23R 3/28 |
| | | | 60/772 |
| 2013/0213342 A1 | 8/2013 | Burton et al. | |
| 2013/0318946 A1* | 12/2013 | Morris | C10L 1/003 |
| | | | 60/273 |
| 2014/0261326 A1* | 9/2014 | Windbergs | F02M 35/10216 |
| | | | 123/445 |
| 2015/0013649 A1 | 1/2015 | Fuqua et al. | |
| 2015/0128907 A1 | 5/2015 | Redon | |
| 2015/0285127 A1 | 10/2015 | Abani et al. | |
| 2016/0153387 A1* | 6/2016 | Ranga | F02D 41/3094 |
| | | | 701/104 |

\* cited by examiner

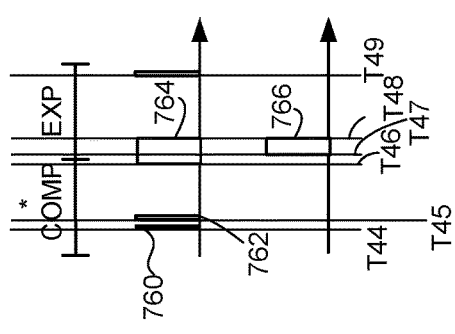
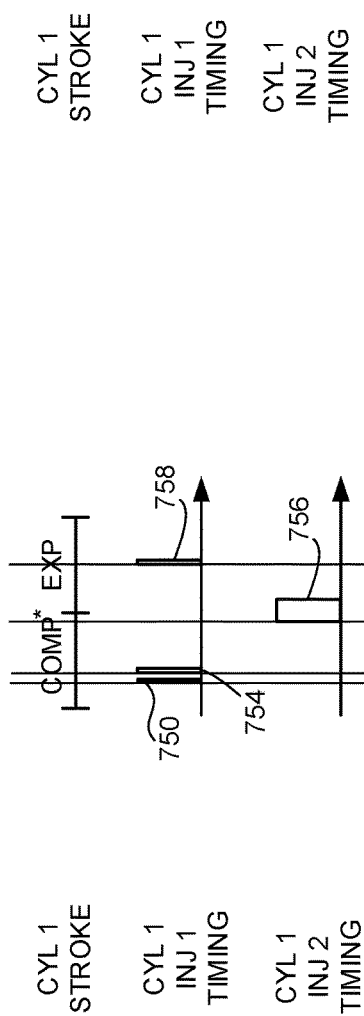
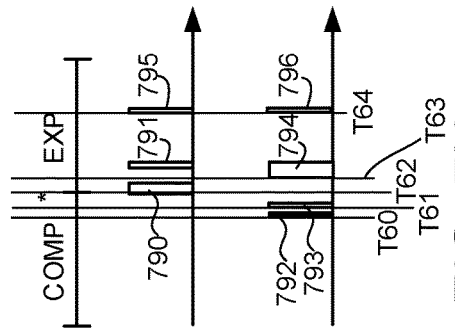
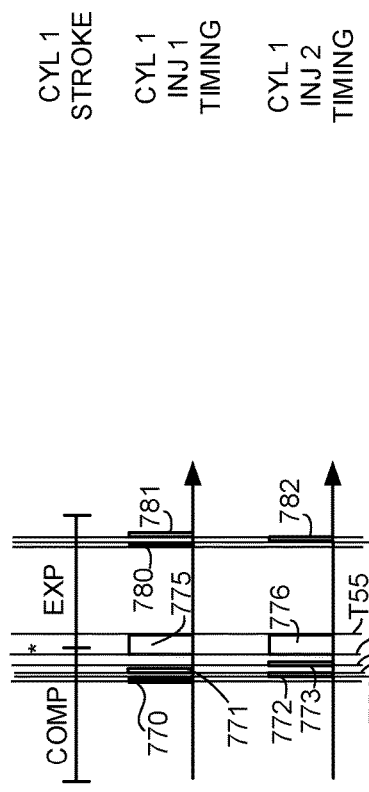

US 10,329,997 B2

DIESEL ENGINE WITH DUAL FUEL INJECTION

BACKGROUND/SUMMARY

A diesel engine may include a turbocharger to extend the engine's power output capacity. The turbocharger may supply pressurized air to the engine so that the cylinder charge mass may be increased to increase engine output power. However, the engine may also operate at low engine air flows and boost pressures when a vehicle driver requests no torque to propel a vehicle. Further, a diesel engine may operate over a wide lean air-fuel ratio operating range. Consequently, diesel fuel injectors may have to supply a large range of fuel amounts to provide desired air fuel ratios over a range of operating conditions. Therefore, diesel fuel injectors are sized to supply fuel at high engine loads and low engine loads. Nevertheless, it may be difficult to provide accurate small amounts of fuel because of kinematics within the fuel injector and because of the fuel injector supplies a wide range of fuel injection amounts. One or more small fuel injection amounts may be supplied to a cylinder during a cylinder cycle to reduce combustion noise and control heat release of fuel being combusted. The small fuel injection amounts, which may be referred to as pilot injections, may be injected during the cylinder cycle, and the pilot injections may precede a main fuel injection during the cylinder cycle. If the pilot fuel injection amounts are inaccurate, engine combustion noise and hydrocarbon emissions may increase.

The inventor herein has recognized the above-mentioned disadvantages and has developed an engine system, comprising: an engine including at least one cylinder; a first diesel fuel injector supplying fuel to the at least one cylinder; and a second diesel fuel injector supplying fuel to the at least one cylinder, the second diesel fuel injector a higher fuel flow rate injector than the first diesel fuel injector.

By supplying diesel fuel to a diesel engine via two different diesel fuel injectors having two different diesel fuel flow rates, it may be possible to supply accurate amounts of diesel fuel during pilot fuel injections and meet diesel fuel injection amounts at higher engine loads. In particular, pilot fuel injections may be provided by a lower flow fuel injector and main fuel injection amounts may be provided by a higher flow fuel injector. Further, the low fuel flow injector and the higher fuel flow injector may both supply main fuel injection pulses to provide desired engine air-fuel ratios at higher engine loads and higher engine speeds when fuel injection time may be short. In this way, the accuracy of injecting small fuel amounts and large fuel amounts during a cylinder cycle may be improved.

The present description may provide several advantages. Specifically, the approach may reduce engine emissions by improving accuracy of an amount of fuel delivered during a cylinder cycle. In addition, the approach may reduce engine combustion noise. Further, the approach may provide more consistent engine operation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 7A-7H show example fuel injection timings;

FIGS. 2-6 are shown approximately to scale.

DETAILED DESCRIPTION

Figure 1:
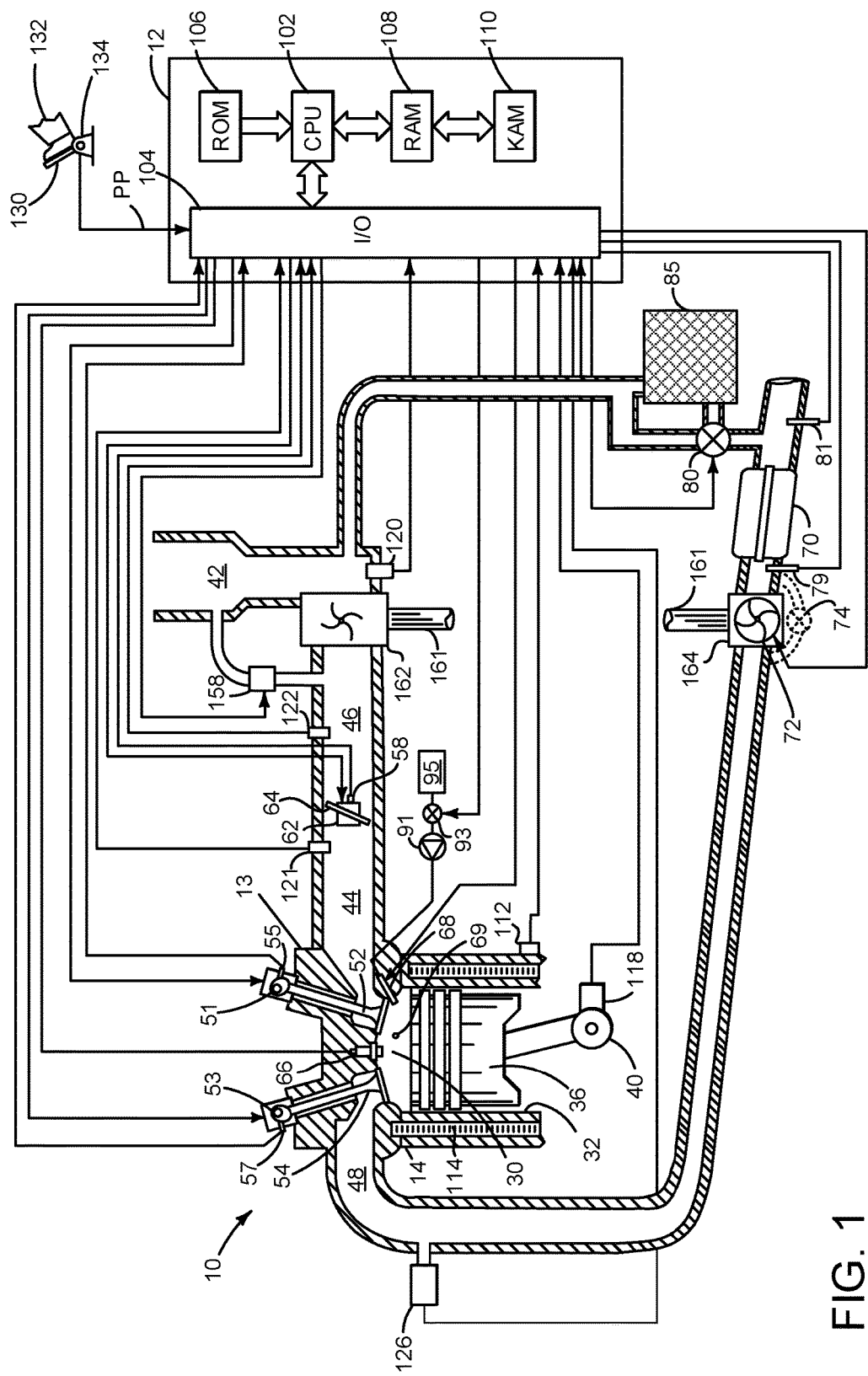
FIG. 1 shows a schematic depiction of an engine.
Figure 2:
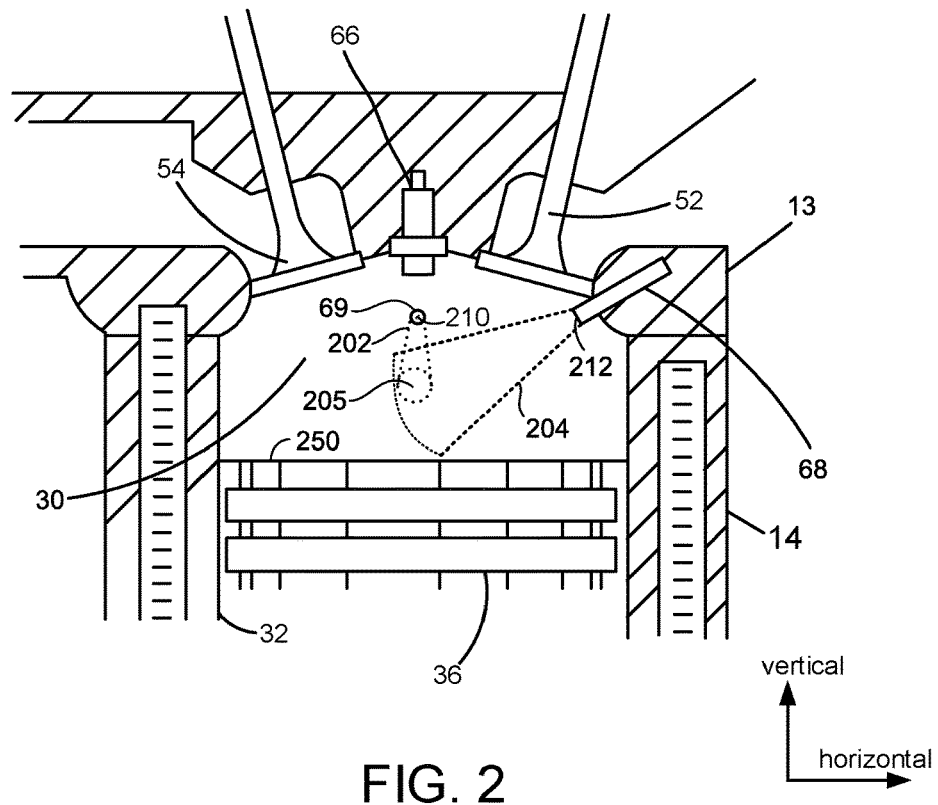
FIG. 2 shows a schematic depiction of fuel injection into a cylinder of the engine shown in FIG. 1.
Figure 3A:
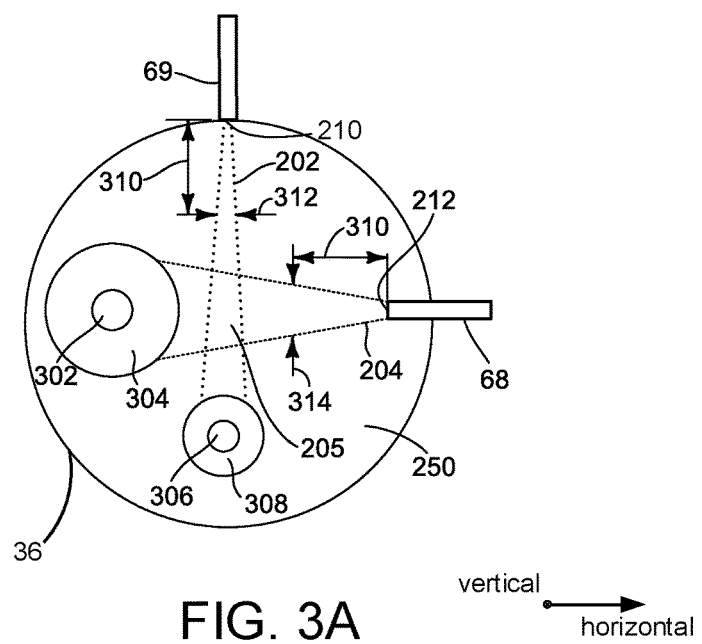
FIGS. 3A-3C show views of fuel injection spray patterns for an engine cylinder.
Figure 3B:
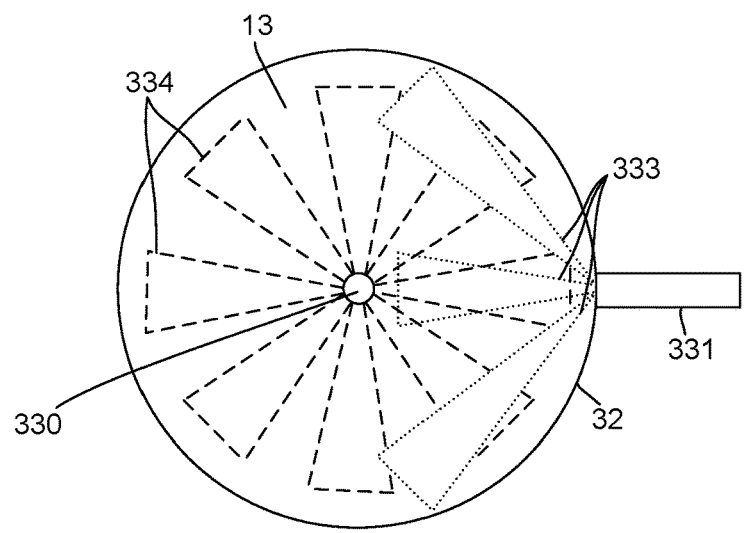
Figure 3C:
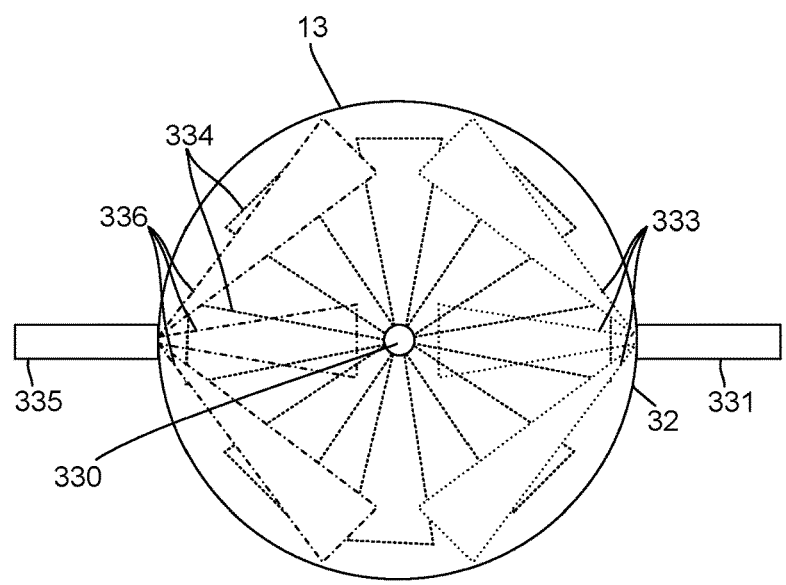
Figure 5:
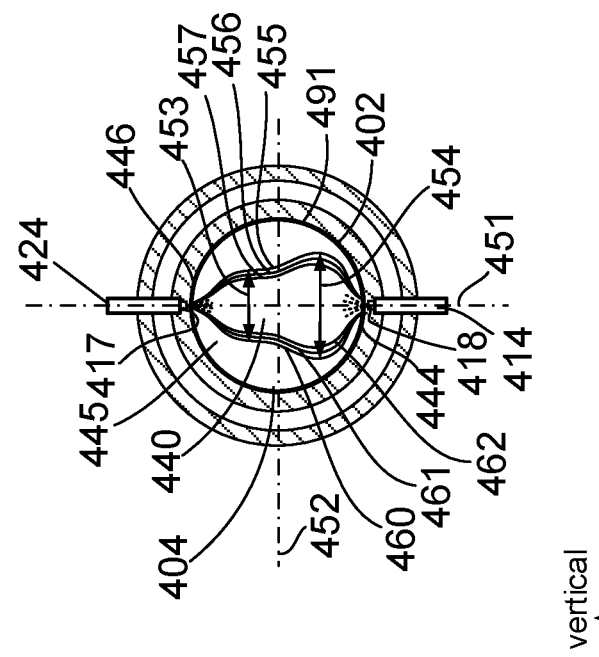
FIG. 5 shows a sectional view of the opposed piston engine.
Figure 4:
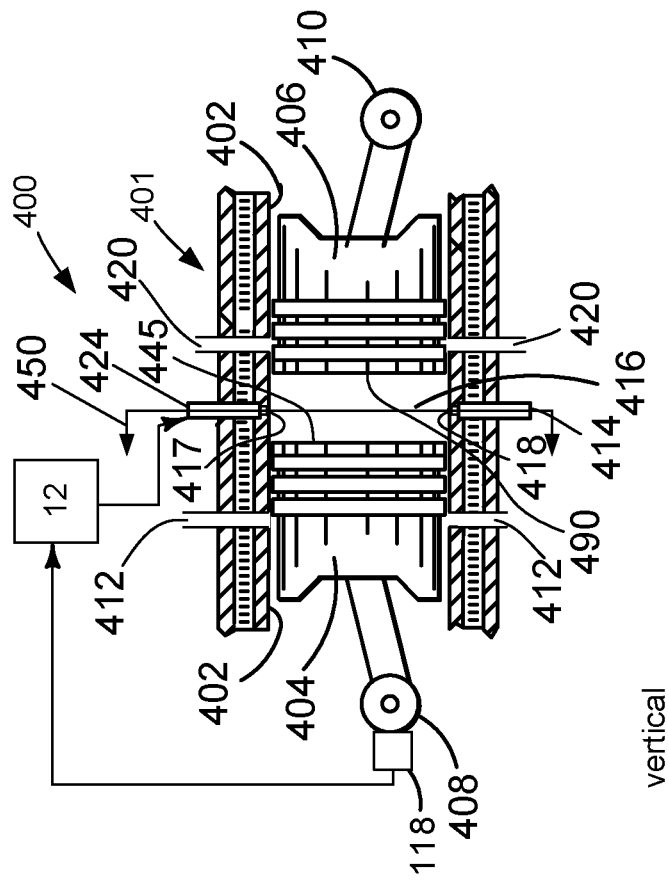
FIG. 4 shows a cross section of an opposed piston engine.
Figure 6:
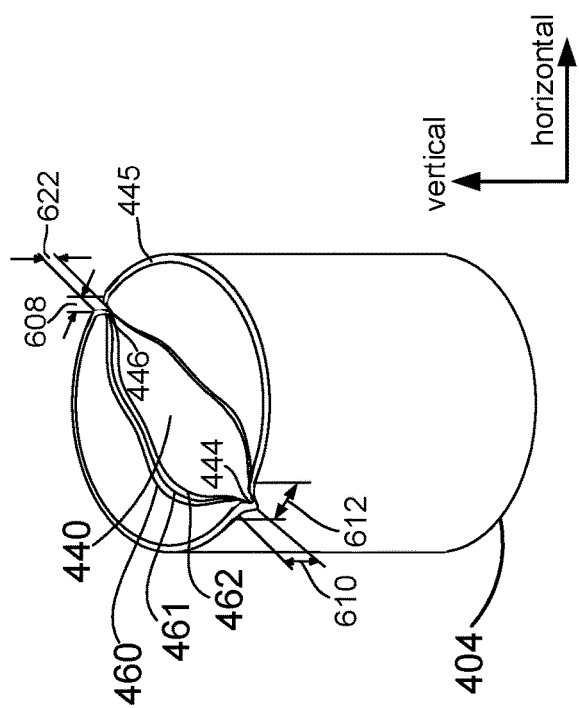
FIG. 6 shows a view of a piston of an opposed piston engine.
Figure 8:
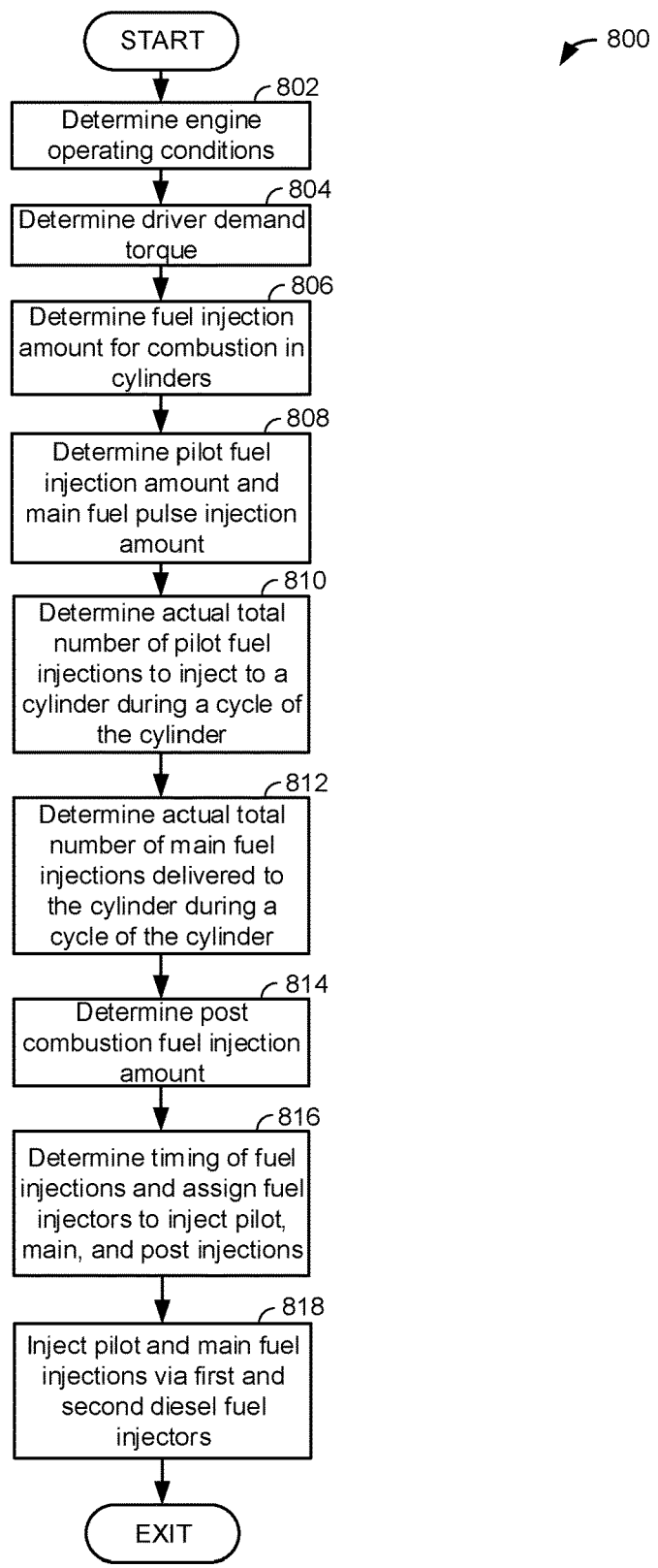
FIG. 8 shows a flowchart of an example method for adjusting fuel injection timing.
Figure 9:
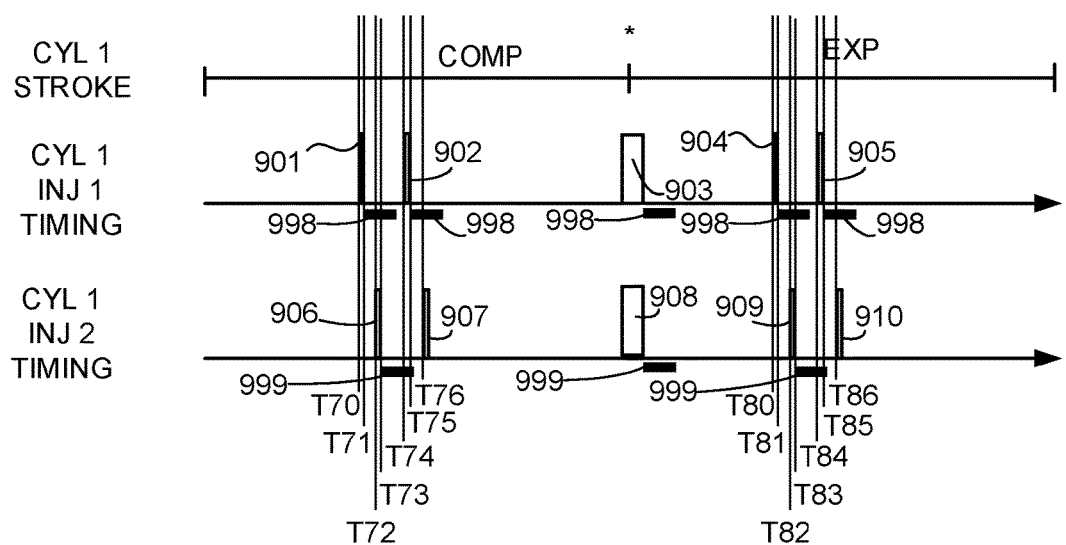
FIG. 9 shows an example fuel injection sequence with close coupled pilot and post fuel injections.

The present description is related to supplying fuel to a diesel engine. FIG. 1 shows one example of a boosted diesel engine. FIGS. 2 and 3A show two views of fuel injector spray patterns that may reduce engine emissions and increase engine oil life. FIGS. 3B and 3C show two additional fuel spray patterns. FIG. 4 shows an opposed piston two cycle diesel engine that includes two fuel injectors per engine cylinder. FIG. 5 shows a sectional view of the engine shown in FIG. 4. FIG. 6 shows a detailed view of an engine piston shown in FIG. 4. Example fuel injection timings for a diesel engine that includes two fuel injectors are shown in FIGS. 7A-7H. A flowchart of a method for injecting fuel to a diesel engine via two fuel injectors is shown in FIG. 8. The method of FIG. 8 may provide close coupled pilot and post fuel injections as shown in FIG. 9.

Referring to FIG. 1, internal combustion engine 10, comprising a plurality of cylinders, one cylinder of which is shown in FIG. 1, is controlled by electronic engine controller 12. The controller 12 receives signals from the various sensors of FIG. 1 and employs the various actuators of FIG. 1 to adjust engine operation based on the received signals and instructions stored on a memory of the controller.

Engine 10 includes combustion chamber 30 and cylinder walls 32 with piston 36 positioned therein and connected to crankshaft 40. Cylinder head 13 is fastened to engine block 14. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Although in other examples, the engine may operate valves via a single camshaft or pushrods. The position of intake cam 51 may be determined by intake cam sensor 55. The position of exhaust cam 53 may be determined by exhaust cam sensor 57.

Fuel injectors 68 and 69 are shown positioned in cylinder head 13 to inject fuel directly into combustion chamber 30, which is known to those skilled in the art as direct injection. Fuel is delivered to fuel injectors 68 and 69 by a fuel system including a fuel tank 95, fuel pump 91, fuel pump control valve 93, and fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162 via shaft 161. In some examples, a charge air cooler may be provided. Compressor speed may be adjusted via adjusting a position of variable vane control 72 or compressor bypass valve 158. In alternative examples, a waste gate 74 may replace or be used in addition to variable vane control 72. Variable vane control 72 adjusts a position of variable geometry turbine vanes. Exhaust gases can pass through turbine 164 supplying little energy to rotate turbine 164 when vanes are in an open position. Exhaust gases can pass through turbine 164 and impart increased force on turbine 164 when vanes are in a closed position. Alternatively, wastegate 74 or a bypass valve allow exhaust gases to flow around turbine 164 so as to reduce the amount of energy supplied to the turbine. Compressor bypass valve 158 allows compressed air at the outlet of compressor 162 to be returned to the input of compressor 162. In this way, the efficiency of compressor 162 may be reduced so as to affect the flow of compressor 162 and reduce the possibility of compressor surge.

Combustion is initiated in combustion chamber 30 when fuel automatically ignites when piston 36 is near top-dead-center compression stroke. In some examples, a universal Exhaust Gas Oxygen (UEGO) sensor 126 may be coupled to exhaust manifold 48 upstream of emissions device 70. In other examples, the UEGO sensor may be located downstream of one or more exhaust after treatment devices. Further, in some examples, the UEGO sensor may be replaced by a NOx sensor that has both NOx and oxygen sensing elements.

At lower engine temperatures glow plug 66 may convert electrical energy into thermal energy so as to raise a temperature in combustion chamber 30. By raising temperature of combustion chamber 30, it may be easier to ignite a cylinder air-fuel mixture via compression.

Emissions device 70 can include an oxidation catalyst and particulate filter, in one example. In another example, multiple emission control devices, each with multiple bricks, can be used. Emissions device 70 can include an oxidation catalyst in one example. In other examples, the emissions device may include a lean NOx trap or a selective catalytic reduction (SCR), and/or a diesel particulate filter (DPF). Upstream temperature sensor 79 and downstream temperature sensor 81 provide exhaust gas temperature measurements for determining the change in exhaust gas temperature across emissions device 70.

Exhaust gas recirculation (EGR) may be provided to the engine via EGR valve 80. EGR valve 80 is a valve that closes or allows exhaust gas to flow from downstream of emissions device 70 to a location in the engine air intake system upstream of compressor 162. In alternative examples, EGR may flow from upstream of turbine 164 to intake manifold 44. EGR may bypass EGR cooler 85, or alternatively, EGR may be cooled via passing through EGR cooler 85. In other, examples high pressure and low pressure EGR system may be provided.

Controller 12 is shown in FIG. 1 as a conventional microcomputer including: microprocessor unit 102, input/output ports 104, read-only memory (e.g., non-transitory memory) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by human foot 132; a measurement of engine manifold pressure (MAP) from pressure sensor 121 coupled to intake manifold 44; boost pressure from pressure sensor 122 exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle.

In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Referring now to FIG. 2, a detailed schematic depiction of fuel injection into a cylinder of the engine of FIG. 1 is shown. In this example, fuel injector 69 and fuel injector 68 are positioned at a right angle (e.g., 90 degrees) with respect to longitudinal directions of the two fuel injector, but the fuel injectors may be positioned at any angle relative to one another that at least partially reduces spray penetration from the fuel injectors reaching cylinder walls 32 when both fuel injectors 68 and 69 simultaneously spray fuel. However, in some examples, the fuel injectors may be positioned so that their fuel spray cones do not overlap when the fuel injectors are simultaneously injecting fuel.

Air enters combustion chamber 30 via intake valve 52 and exhaust gases exit combustion chamber 30 via exhaust valve 54. Fuel injectors 69 and 68 are shown as direct cylinder injectors which inject fuel directly into combustion chamber 30. Fuel injector 69 may be a lower flow fuel injector (e.g., X cc/min @ 100 bar) and fuel injector 68 may be a higher flow fuel injector (e.g., Y cc/min @ 100 bar, where Y is greater than X). Alternatively, fuel injectors 69 and 68 may be fuel injectors with substantially equivalent fuel injection rates (e.g., injector flow rates that are within ±2% of each other). Fuel injector 69 may include fewer and/or smaller nozzle holes through which fuel exits as compared to fuel injector 68. Glow plug 66 may be activated during cold engine starting to facilitate combustion.

Direct diesel fuel injector 69 delivers diesel fuel that forms a spray cone indicated by dotted lines 202. Direct diesel fuel injector 68 delivers diesel fuel that forms a spray cone indicated by dashed lines 204. Fuel in the spray cone from fuel injector 69 may intersect and collided with fuel in the spray cone from fuel injector 68 in the region indicated at 205. In other examples, as shown in FIGS. 3B and 3C, the fuel injectors may provide a plurality of fuel spray cones, some of which may intersect and collide when fuel is injected. By intersecting the fuel spray cones, at least some fuel penetration or distance that fuel travels from each of fuel injectors 69 and 68 may be reduced. For example, when the fuel from spray cone 202 collides with the fuel from spray cone 204, the amount of fuel that exits nozzle 212 of fuel injector 68 and travels through combustion chamber 30 and impacts the combustion chamber's walls directly may be reduced. Likewise, the amount of fuel that exits nozzle 210 of fuel injector 69 and travels through combustion chamber 30 and impacts the combustion chamber's walls directly may be reduced. Dilution of engine oil may be reduced by reducing an amount of fuel that directly flows from the injectors to the cylinder walls. Further, engine emissions may be reduced by reducing an amount of fuel that flows directly from fuel injector nozzles to cylinder walls.

Fuel injector 68 may inject fuel that impinges on cylinder wall 32 if fuel is injected via only fuel injector 68 when piston 36 is in a lower position. If piston 36 is in a higher position, a fuel injected by fuel injector 68 may impinge on a first bowl in top 250 of piston 36. Likewise, fuel injector 69 may inject fuel that impinges on cylinder wall 32 if fuel is injected via only fuel injector 69 when piston 36 is in a lower position. If piston 36 is in a higher position, a fuel injected by fuel injector 69 may impinge on a second bowl in top 250 of piston 36.

Referring now to FIG. 3A, a view of fuel injector spray patterns for an engine cylinder is shown. The view shown in FIG. 3A is from a top 250 side of piston 36 shown in FIGS. 1 and 2. The direction of spray from fuel injector 69 nozzle 210 is a right angle from the direction of spray from fuel injector 68 nozzle 212. The direction of spray for each fuel injector is in the longitudinal direction of each fuel injector. In this example, fuel injector 69 is a lower flow rate fuel injector and fuel injector 68 is a higher flow rate fuel injector. In addition, the width of spray cone 202 emitted by injecting fuel from fuel injector 69 is narrower as indicated at 312 a predetermined distance 310 away from nozzle 210 than the width of spray cone 204 emitted by injecting fuel from fuel injector 68 as indicated at 314 which is a predetermined distance 310 away from nozzle 210. The predetermined distances 310 away from nozzle 210 and 212 are a same distance. Although in some examples, the width of the spray cones may be the same.

If piston 36 is higher in the cylinder (e.g., closer to top-dead-center) and fuel is injected via fuel injector 69, fuel injected from injector 69 may flow directly to bowl 308. Bowl 308 includes a land 306 that may be flush with top of piston 250. Similarly, if piston 36 is higher in the cylinder (e.g., closer to top-dead-center) and fuel is injected via fuel injector 68, fuel injected from injector 69 may flow directly to bowl 304. Bowl 304 includes a land 302 that may be flush with top of piston 250. The diameter of bowl 308 is smaller than the diameter of bowl 304 because each bowl may be sized to the extents (e.g., diameter of the spray cone) of the respective spray cones. By sizing the bowls to the spray cones, mixing of air and fuel may be improved to lower emissions. Thus, for a narrower spray cone 202 a smaller diameter bowl 308 may be provided, and for a wider spray cone 204 a larger diameter bowl 304 may be provided. In this way, piston geometry may be tailored to dimensions of different fuel spray coned provided by different flow rate fuel injectors. The positions and dimensions of bowls 304 and 308 are for illustration purposes and should not be construed as limiting. Further, bowls 304 and 308 may be referred to as cavities.

Referring now to FIG. 3B, alternative injector locations in a cylinder and spray patterns are shown. In this example, a first fuel injector 330 is shown positioned centrally in a cylinder and in a cylinder head 13. A second fuel injector 331 may be positioned along a cylinder wall 32. First fuel injector 330 provides a circular spray pattern with a plurality of spray cones that are indicated by dashed lines 334. Second fuel injector 331 provides a fan shaped spray pattern with a plurality of spray cones that are indicated by dotted lines 333. Fuel spray cones indicated by dashed lines 334 may intersect and collide with spray cones indicated by dotted lines 333 when both first fuel injector 330 and second fuel injector 331 simultaneously inject fuel. As such, fuel penetration (e.g., distance fuel travels in the spray cone) may be at least partially reduced.

Referring now to FIG. 3C, alternative injector locations in a cylinder and spray patterns are shown. In this example, a first fuel injector 330 is shown positioned centrally in a cylinder and in a cylinder head 13. A second fuel injector 331 may be positioned along a cylinder wall 32, and a third fuel injector 335 may also be positioned along cylinder wall 32. First fuel injector 330 provides a circular fuel spray pattern with a plurality of fuel spray cones that are indicated by dashed lines 334. Second fuel injector 331 provides a fan shaped fuel spray pattern with a plurality of fuel spray cones that are indicated by dotted lines 333. Third fuel injector 335 provides a fan shaped fuel spray pattern with a plurality of fuel spray cones that are indicated by dot-dash lines 336. Fuel spray cones indicated by dashed lines 334 may intersect and collide with fuel spray cones indicated by dotted lines 333 when both first fuel injector 330 and second fuel injector 331 simultaneously inject fuel. Similarly, fuel spray cones indicated by dashed lines 334 may intersect and collide with fuel spray cones indicated by dot-dash lines 336 when both first fuel injector 330 and third fuel injector 335 simultaneously inject fuel. As such, fuel penetration (e.g., distance fuel travels in the spray cone) may be at least partially reduced.

Referring now to FIG. 4, a schematic cross section of a cylinder of 401 of an opposed-piston two stroke engine is shown. Two stroke opposed piston internal combustion engine 400, comprising a plurality of cylinders, one cylinder of which is shown in FIG. 4, is controlled by electronic engine controller 12. The opposed piston engine system may include controller 12 and its associated sensors and actuators shown in FIG. 1, some of which are omitted from FIG. 4 for the sake of brevity. The two stroke engine includes a compression stroke and an expansion/exhaust stroke. Pistons 404 and 406 reciprocate moving toward squish region 416 and away from crankshafts 408 and 410 respectively during the compression stroke. Pistons 404 and 406 reciprocate moving away from squish region 416 and toward crankshafts 408 and 410 respectively during the expansion/exhaust stroke.

Cylinder 401 includes a squish area 416 where air and diesel fuel may be combusted. First piston 404 is shown mechanically coupled to first crankshaft 408 and second piston 406 is shown mechanically coupled to second crankshaft 410. First crankshaft 408 may be mechanically coupled to second crankshaft 410 via a chain or gear set (not shown). Pistons 404 and 406 reciprocate within walls 402 of cylinder 401. Piston 404 and piston 406 travel together toward squish area 416 during their respective compression strokes and away from the squish area 416 after gases in the cylinder are combusted and expand. Air enters cylinder 401 via intake ports 412 and exhaust exits cylinder 401 via exhaust ports 420.

Fuel injector 424 is a lower flow rate fuel injector having the same fuel spray characteristics as fuel injector 69 of FIGS. 1-3A or other fuel injectors described herein. Fuel injector 414 is a higher flow rate fuel injector having the same fuel spray characteristics as fuel injector 68 of FIGS. 1-3A or other fuel injectors described herein. Fuel injector nozzles 417 and 418 are arranged directly opposed to each other so that spray cones of fuel injected from diesel fuel injectors 424 and 414 cause fuel droplets from each spray cone to collide. Section 450 is shown in FIG. 5 and it provides a view of a top of piston 404 and a view of fuel injector arrangement. The top 445 of piston 406 may be the same as the top 490 of piston 406.

Referring now to FIG. 5, section 450 of cylinder 401 shown in FIG. 4 is shown. Fuel injectors 424 and 414 are shown bisected via vertical centerline 451. Further, piston 404 is bisected by vertical centerline 451. Cavity sidewall 457 is a lower sidewall, sidewall 456 is a middle level sidewall, and sidewall 455 is an upper sidewall of cavity 440. Similarly, cavity sidewall 462 is a lower sidewall, sidewall 461 is a middle level sidewall, and sidewall 460 is an upper sidewall of cavity 440. Upper sidewalls 460 and 455 are closer to top 445 of piston 404 than lower sidewalls 462 and 457. Cavity sidewalls 455, 456, and 457 are symmetric with cavity sidewalls 460, 461, and 462 about vertical centerline 451. However, cavity sidewalls 455, 456, 457, 460, 461, and 462 are asymmetric about horizontal centerline 452. Thus, cavity 440 is similar to a pear shape.

Cavity 440 is shaped to conform to the spray cones of fuel injectors 424 and 414. Cavity 440 begins near fuel injector 424 at a first narrow opening 446 at the outside wall 491 of piston 404. Cavity 440 includes a second wide opening 444 near fuel injector 414 at the outside wall 491 of piston 404. Fuel injector 424 provides a narrower fuel spray cone than fuel injector 414 so cavity 440 is produced with a narrower wall boundary 453 between fuel injector nozzle 417 and horizontal centerline 452 as compared to wall boundary 454 that is provided for the fuel spray cone of fuel injector 414 between fuel injector nozzle 418 and horizontal centerline 452. Thus, cavity 440 allows the fuel injector cones to expand so that fuel may reach the center of piston 404 to promote fuel mixing. By improving fuel mixing, engine emissions may be improved.

It should be noted that piston 406 may be formed the same as piston 404. Thus, piston 406 may also accommodate the spray cones of fuel injectors 414 and 424. Further, in some examples, piston 406 may be complementary to piston 404 such that a high portion of piston 406 is opposite a low side of piston 404 and vice-versa. In some examples, top of piston 455 may be higher on one side of cavity 440 than on the other side of cavity 440 (e.g., the left side of piston top 445 may be higher than right side of piston top 445). In addition, the nozzle of fuel injector 414 may be offset from the nozzle of fuel injector 424 in some examples.

Referring now to FIG. 6, a perspective view of piston 404 from FIG. 4 is shown. Cavity 440 is shown with upper sidewall 460, middle sidewall 461, and lower sidewall 462 exposed. Cavity opening 444 is shown with depth 610 and width 612. Cavity opening 446 is shown with depth 622 and width 608. Depth 622 is less than depth 610 and width 608 is less than width 612. The depths and widths of cavity 440 are sized to accommodate the spray cones of fuel injectors 414 and 424 while persevering structural strength of piston 404. In alternative examples, the depths of openings 446 and 444 may be equivalent so that cavity 440 is of uniform depth.

FIGS. 2-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Thus, the system of FIGS. 1-6 provides for an engine system, comprising: an engine including at least one cylinder; a first diesel fuel injector supplying fuel to the at least one cylinder; and a second diesel fuel injector supplying fuel to the at least one cylinder, the second diesel fuel injector a higher fuel flow rate injector than the first diesel fuel injector. The engine system includes where the first diesel fuel injector and the second diesel fuel injector inject diesel fuel directly into the at least one cylinder. The engine system further comprises positioning the first diesel fuel injector and the second diesel fuel injector in the engine such that fuel exiting the first diesel fuel injector collides with fuel exiting the second diesel fuel injector without fuel from the first diesel fuel injector and fuel from the second diesel fuel injector colliding with a surface of the engine. The engine system further comprises a piston in the at least one cylinder, the piston including a first cavity and a second cavity. The engine system includes where the first cavity is positioned in a top of the piston to receive fuel directly from a spray cone of fuel injected via the first diesel fuel injector. The engine system includes where the second cavity is positioned in a top of the piston to receive fuel directly from a spray cone of fuel injected via the second diesel fuel injector, and where the second cavity has a larger volume than the first cavity. The engine system includes where the first diesel fuel injector and the second diesel fuel injector are coupled to a cylinder head.

The engine system of FIGS. 1-6 also provides for an engine system, comprising: an opposed piston engine including at least one cylinder and two pistons positioned within the at least one cylinder; a first diesel fuel injector supplying diesel fuel to the at least one cylinder; and a second diesel fuel injector supplying diesel fuel to the at least one cylinder, the second diesel fuel injector a higher fuel flow rate injector than the first diesel fuel injector. The engine system further comprises cavity in a first of the two pistons. The engine system includes where a depth of the cavity is non-uniform. The engine system includes where a first opening width of the cavity is less than a second opening width of the cavity. The engine system includes where the first and second fuel injectors are positioned directly opposed to each other. The engine system includes where the cavity is asymmetric about a horizontal centerline of first of the two pistons, the horizontal centerline perpendicular to longitudinal directions of the first and second diesel fuel injectors. The engine system includes where the cavity includes three sidewalls.

The system of FIGS. 1-6 also provides for an engine system, comprising: an engine including at least one cylinder; a first diesel fuel injector supplying fuel to the at least one cylinder; a second diesel fuel injector supplying fuel to the at least one cylinder, the second diesel fuel injector a higher fuel flow rate injector than the first diesel fuel injector; and a piston positioned within the at least one cylinder and including a first cavity and a second cavity, the first cavity smaller than the second cavity. The engine system includes where the first cavity surrounds a first land and where the second cavity surrounds a second land. The engine system includes where the first cavity is positioned to receive fuel from the first diesel fuel injector. The engine system includes where the second cavity is positioned to receive fuel from the second diesel fuel injector. The engine system includes where a fuel spray cone of the first diesel fuel injector provides less penetration into the at least one cylinder than a fuel spray cone of the second diesel fuel injector when the first diesel fuel injector and the second diesel fuel injector inject fuel during same engine operating conditions. The engine system includes where the first diesel fuel injector and the second diesel fuel injector are supplied diesel fuel via a same fuel system.

Referring now to FIGS. 7A-7D, fuel injection timing diagrams for the four stroke engine of FIGS. 1-3C are shown. The fuel injection timings may be provided via controller 12 and fuel injectors 68 and 69 or other fuel injectors described herein. The fuel injection timing shown may be provided in the system of FIGS. 1-3C. Further, the fuel injection timings may be provided via the method of FIG. 8 in cooperation with the system of FIGS. 1-3C. Vertical lines represent times of interest (e.g., T1-T4) during the respective sequence plots.

Figure 7A:
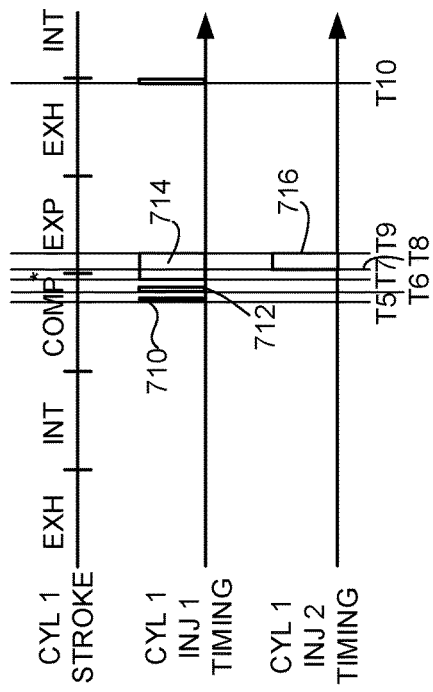

The first plot from the top of FIGS. 7A-7D represents cylinder stroke of cylinder number one of an engine. The horizontal axis is broken into a series of segments that identify the cylinder stroke that cylinder number one is on as time proceeds from the left side of the figure to the right side of the figure. Exhaust stroke is abbreviated EXH while intake, compression, and expansion strokes are abbreviated by INT, COMP, and EXP respectively. The * indicates the beginning of combustion for the illustrated four stroke cylinder cycle. Thus, FIG. 7A shows a progression of a cylinder cycle over time.

The second plot from the top of FIGS. 7A-7D represents fuel injection timing during a cylinder cycle for fuel injector number one (e.g., a low flow fuel injector such as 69 shown in FIG. 1), which injects diesel fuel into cylinder number one. The pulse widths (e.g., 702, 704, 708) vary in width and the width is an indication of an amount of fuel injected in the fuel pulse. The wider the pulse is the larger the amount of fuel that is injected into the cylinder during the pulse.

The third plot from the top of FIGS. 7A-7D represents fuel injection timing during a cylinder cycle for fuel injector number two (e.g., a high flow fuel injector such as 69 shown in FIG. 1), which injects diesel fuel into cylinder number one. The pulse widths (e.g., 706) vary in width and the width is an indication of an amount of fuel injected in the fuel pulse. The wider the pulse is the larger the amount of fuel that is injected into the cylinder during the pulse. The shorter the pulse is the smaller the amount of fuel that is injected into the cylinder during the pulse.

FIG. 7A shows example fuel injection timing where the lower flow fuel injector supplies fuel to the engine cylinder for pilot injections and post injections. Pilot injections are short duration fuel injections that may be less than 4 mg. Pilot fuel injections start and end before top-dead-center compression stroke in the cylinder cycle in which they are injected. The pilot fuel injections may reduce engine combustion noise, control peak cylinder pressures, and adjust heat release within the cylinder. Main fuel injections are injections of a greatest amount of fuel during a cylinder cycle. The main fuel injections may range from 3 mg to 100 mg per cylinder cycle. Pilot fuel injections precede the main fuel injections. Early post fuel injections may occur ten crankshaft degrees after top dead center compression stroke and after a main fuel injection. Early post fuel injections may range from 1 mg to 10 mg. Late post injections are fuel injections that are preformed after combustion of the main fuel injection pulse is complete and before an exhaust valve of the cylinder receiving the fuel closes during the cylinder cycle. Early and late post injections may be useful for regenerating emissions control devices in the engine's exhaust system. FIG. 7A provides a main fuel injection pulse via the higher flow fuel injector. The main fuel injection pulse may provide significant chemical energy to meet a driver demand torque.

At the time T1, the engine is operating at a middle level engine load (not shown) and a first pilot fuel injection begins via fuel injector number one. The first pilot fuel injection 702 is provided during the compression stroke of cylinder number one. Shortly thereafter, the first pilot fuel injection ends. The low flow rate fuel injector may be configured with less moving mass (e.g., the low flow fuel injector pintle may include less mass) so that it makes it possible to open and close the low fuel flow injector in a shorter time than the higher flow fuel injector. Alternatively, the low flow fuel injector may include a nozzle throttle to control flow, which can control the pintle opening and closing rate. Further, the low flow fuel injector may inject smaller masses of fuel more accurately than the higher flow fuel injector. As such, the low flow fuel injector may be suited for providing pilot fuel injections. The second higher flow fuel injector is not injecting fuel.

At time T2, a second pilot fuel injection 704 begins via the first fuel injector. Controller 12 may judge which fuel injector injects pilot fuel injections in response to the pilot fuel injection amount and/or fuel injector minimum pulsewidth limitations. In one example, controller selects a low flow fuel injector to inject pilot fuel injection amounts when the pilot fuel injection amount is less than a threshold amount. The second pilot fuel injection 704 is provided during the compression stroke of cylinder number one. Shortly thereafter, the second pilot fuel injection ends.

At time T3, a main fuel injection 706 begins via the second fuel injector. The main fuel injection 706 is provided during the compression stroke of cylinder number one. The main fuel injection pulse ends before top-dead-center compression stroke. The first fuel injector is not injecting fuel to cylinder number one.

At time T4, a first post fuel injection begins. In this example, the post fuel injection is early (e.g., within 30 crankshaft degrees of end of combustion in cylinder number one). The first post fuel injection is provided via the first fuel injector. The second fuel injector is not injecting fuel. Shortly after time T4, the first post fuel injection ends and fuel delivery to cylinder number one for the illustrated cylinder cycle ends. In other examples, additional or fewer post fuel injections and pilot fuel injections may be provided.

In this way, the low flow fuel injector may supply the smaller fuel amounts for pilot and post fuel injections. Larger fuel injection amounts may be provided by the higher flow fuel injector. Thus, the fuel injections may be allocated between the two different fuel injectors in a way that improves accuracy of pilot fuel injection amounts, post fuel injection amounts, and main fuel injection amount.

Figure 7B:
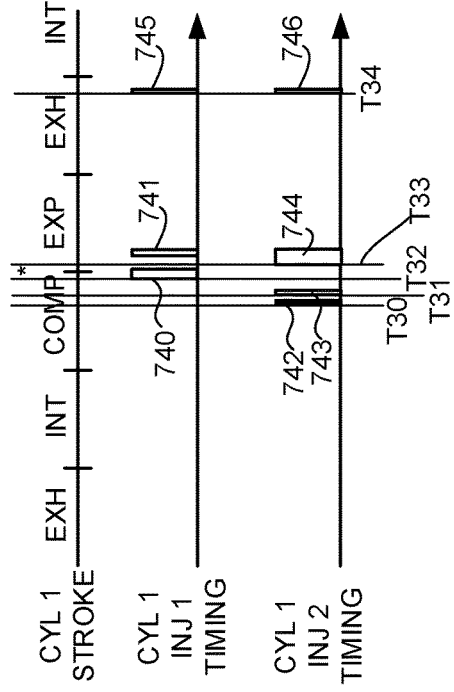

FIG. 7B shows second example fuel injection timing where the lower flow fuel injector supplies fuel to the engine cylinder for pilot injections, a main injection, and post injections. At least one main injection is provided to a cylinder when the cylinder is fueled during a cycle of the cylinder. The lower flow fuel injector may provide a main fuel injection at higher engine speeds and loads when the higher flow fuel injector lacks time to provide a sufficient amount of fuel to meet cylinder air-fuel requirements. FIG. 7B also provides a main fuel injection pulse via the higher flow fuel injector. The two main fuel injection pulses may provide significant chemical energy to meet a driver demand torque.

At the time T5, the engine is operating at a higher level engine load (not shown) and a first pilot fuel injection begins via fuel injector number one. The first pilot fuel injection 710 begins during the compression stroke of cylinder number one. Shortly thereafter, the first pilot fuel injection ends. The second higher flow fuel injector is not injecting fuel.

At time T6, a second pilot fuel injection 712 begins via the first fuel injector. The second pilot fuel injection 712 is provided during the compression stroke of cylinder number one. Shortly thereafter, the second pilot fuel injection ends. The second fuel injector is not supplying fuel to cylinder number one.

At time T7, a main fuel injection 714 begins via the first fuel injector. The main fuel injection is provided during the compression stroke of cylinder number one. The first fuel injector may provide a main fuel injection so that a desired engine air-fuel ratio may be provided.

At time T8, a main fuel injection 716 begins via the second fuel injector. The main fuel injection 716 is provided during the compression stroke of cylinder number one. The main fuel injection 714 provided via the first fuel injector and the main fuel injection 716 provided via the second fuel injector overlap. The overlap may be useful to reduce the possibility of injected fuel impinging on cylinder walls.

It should be noted that in other examples, the second fuel injector may begin to inject its main fuel injection amount in a cylinder cycle before the first fuel injector begins to inject its main fuel injection amount in the cylinder cycle. The particular timing may depend on fuel injector specifications and engine operating conditions. In addition, if the two fuel injector's have fuel spray patterns that impinge on each other during simultaneous injection, the two fuel injectors may only inject simultaneously during pilot or post injections. However, if the two fuel injectors have spray patterns that do not have fuel spray patterns that impinge on each other during simultaneous injection, the two fuel injectors may inject simultaneously during main fuel injections of each fuel injector.

At time T9, the main fuel pulse 714 provided via the first fuel injector and the main fuel pulse 716 provided via the second fuel injector end. The main fuel injection pulses may end simultaneously to reduce exhaust temperature and improve combustion efficiency.

At time T10, a first post fuel injection is provided. In this example, the post fuel injection is late (e.g., near exhaust valve closing of cylinder number one). The first post fuel injection is provided via the first fuel injector. Shortly thereafter, the first post fuel injection ends and fuel delivery to cylinder number one for the illustrated cylinder cycle ends.

In this way, the low flow fuel injector may supply the smaller fuel amounts for pilot and post fuel injections. Further, a main fuel injection by the second fuel injector may be augmented by a main fuel injection from the first fuel injector. Thus, the fuel injections may be allocated between the two different fuel injectors in a way that improves accuracy of pilot fuel injection amounts and increases fuel supplied to meet higher engine loads.

Figure 7C:
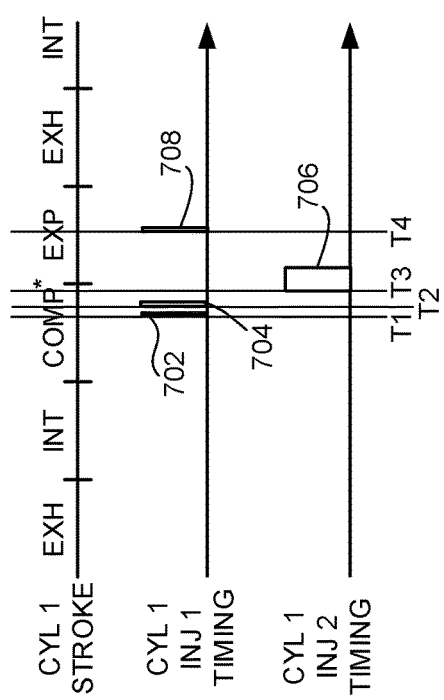

FIG. 7C shows third example fuel injection timing where the first fuel injector and the second fuel injector alternate pilot injections and post injections. Main fuel injections are also provided via the first and second fuel injector. The lower flow fuel injector may provide a main fuel injection at higher engine speeds and loads when the higher flow fuel injector lacks time to provide a sufficient amount of fuel to meet cylinder air-fuel requirements. The pilot fuel injections may be alternated between the first and second fuel injectors to allow moving masses within the injectors to settle to a desired position (e.g., closed) and to allow electrical/magnetic components (e.g., coils) to a achieve a desired state (e.g., magnetic field strength less than a threshold) before the fuel injectors are reactivated. Thus, the amount of time between when a fuel injector ends injection and begins a new injection during a cycle of a cylinder may be increased to improve fuel delivery accuracy and repeatability. Further, the amount of time between an end of a first pilot injection in a cylinder cycle and a beginning of a second pilot fuel injection in the cylinder cycle may be reduced because the fuel injectors are less constrained by each fuel injectors off dwell time. The two main fuel injection pulses may provide significant chemical energy to meet a driver demand torque.

At the time T20, the engine is operating at a part engine load (not shown) and a first pilot fuel injection 720 begins via fuel injector number one. The first pilot fuel injection 720 begins during the compression stroke of cylinder number one. Shortly thereafter, the first pilot fuel injection ends. The second higher flow fuel injector is not injecting fuel.

At time T21, a second pilot fuel injection 722 begins via the second fuel injector. The second pilot fuel injection 722 is provided during the compression stroke of cylinder number one. Shortly thereafter, the second pilot fuel injection ends. The first fuel injector is not supplying fuel to cylinder number one.

At the time T22, a third pilot fuel injection 721 begins via fuel injector number one. The third pilot fuel injection 721 begins during the compression stroke of cylinder number one. Shortly thereafter, the third pilot fuel injection ends. The second higher flow fuel injector is not injecting fuel.

At time T23, a fourth pilot fuel injection 723 begins via the second fuel injector. The fourth pilot fuel injection 723 is provided during the compression stroke of cylinder number one. Shortly thereafter, the fourth pilot fuel injection ends. The first fuel injector is not supplying fuel to cylinder number one.

At time T24, main fuel injections 725 and 726 begin via the first fuel injector and the second fuel injector. The main fuel injection is provided during the compression stroke of cylinder number one. The first fuel injector and the second fuel injector may provide main fuel injections so that a desired engine air-fuel ratio may be provided.

At time T25, the main fuel pulse 725 provided via the first fuel injector and the main fuel pulse 726 provided via the second fuel injector end. The main fuel injection pulses may end simultaneously to improve engine emissions and regulate heat release during combustion. Further, by simultaneously ceasing fuel injection via the first and second fuel injectors, the possibility of fuel impinging on cylinder walls may be reduced.

At time T26, a first post fuel injection begins. In this example, the post fuel injection is late. The first post fuel injection is provided via the first fuel injector. Shortly thereafter, the first post fuel injection ends.

At time T27, a second post fuel injection begins. The second post fuel injection is provided via the second fuel injector. Shortly thereafter, the second post fuel injection ends.

At time T28, a third post fuel injection is provided. The third post fuel injection is provided via the first fuel injector. Shortly thereafter, the third post fuel injection ends and fuel delivery to cylinder number one for the illustrated cylinder cycle ends. Thus, post fuel injections may be alternated between the first fuel injector and the second fuel injector to allow operation of mechanical and electrical/magnetic components of the fuel injector to stabilize to improve fuel delivery accuracy.

Alternating pilot and post fuel injections may also be useful when the flow rates of the first and second fuel injectors are equal or different. In this way, a short recovery time between fuel injections may be provided for each fuel injector of the engine. Further, a main fuel injection by the second fuel injector may be augmented by a main fuel injection from the first fuel injector. Thus, the fuel injections may be allocated between the two different fuel injectors in a way that improves accuracy of pilot fuel injection amounts and increases fuel supplied to meet higher engine loads. Additionally, injecting fuel with two fuel injectors allows fuel to be injected via a second fuel injector shortly after a first injector ceases to inject fuel such that the second fuel injector injects during an off dwell time of the first fuel injector. This allows closer coupling of injections, which may improve engine noise reduction and emissions.

Figure 7D:
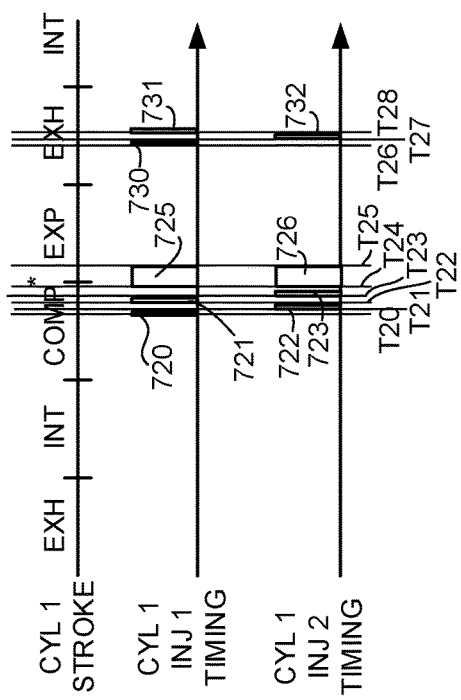

FIG. 7D shows fourth example fuel injection timing where the lower flow fuel injector (e.g., fuel injector number one) supplies fuel to the engine cylinder for a main injection and a post injection. The lower flow fuel injector may provide one or two main fuel injections at higher engine speeds and loads so that the pressure rise in the cylinder may be controlled and limited with early start of injection for the main fuel pulse. FIG. 7D also provides pilot fuel injections and a main fuel injection pulse via the higher flow fuel injector (e.g., fuel injector number two). The second fuel injector may supply pilot fuel injections at higher engine loads when the second fuel injector is a higher flow fuel injector. The three main fuel injection pulses may provide significant chemical energy to meet a driver demand torque.

At the time T30, the engine is operating at a higher level engine load (not shown) and a first pilot fuel injection begins via fuel injector number two. The first pilot fuel injection 742 begins during the compression stroke of cylinder number one. Shortly thereafter, the first pilot fuel injection ends. The first lower flow fuel injector is not injecting fuel at time T30.

At time T31, a second pilot fuel injection 743 begins via the second fuel injector. The second pilot fuel injection 743 is provided during the compression stroke of cylinder number one. Shortly thereafter, the second pilot fuel injection ends. The first fuel injector is not supplying fuel to cylinder number one.

At time T32, a main fuel injection 740 begins via the first fuel injector. The main fuel injection 740 is provided during the compression stroke of cylinder number one. The first fuel injector may provide a main fuel injection so that a desired engine air-fuel ratio may be provided. Further, combustion heat release may be controlled to provide slower heat release when the first fuel injector is a lower flow fuel injector as compared to if the first fuel injector is a higher flow fuel injector.

At time T33, a main fuel injection 744 begins via the second fuel injector. The main fuel injection 744 is provided during the compression stroke of cylinder number one. The main fuel injection 740 provided via the first fuel injector and the main fuel injection 744 provided via the second fuel injector do not overlap, but in other examples they may overlap. A second main fuel injection 741 is provided via the first fuel injector shortly after time T33.

At time T34, a first post fuel injection 745 is provided via the first injector and a second post fuel injection 746 is provided via the second injector. The first and second injections are simultaneous and contemporaneous so as to reduce the possibility of fuel impinging on cylinder walls. In this example, the post fuel injections are late (e.g., near exhaust valve closing of cylinder number one). The first and second post fuel injections end and fuel delivery to cylinder number one for the illustrated cylinder cycle ends.

In this way, the higher flow fuel injector may supply the pilot fuel injections at higher engine loads when larger pilot fuel injection amounts may be desired. Further, a main fuel injection by the second fuel injector may be augmented by a main fuel injection from the first fuel injector. Thus, the fuel injections may be allocated between the two different fuel injectors in a way that improves accuracy of pilot fuel injection amounts and increases fuel supplied to meet higher engine loads.

Referring now to FIGS. 7E-7H, fuel injection timing diagrams for the two stroke engine of FIGS. 4-6 are shown.

The fuel injection timings may be provided via controller 12 and fuel injectors 414 and 424. The fuel injection timing shown may be provided in the system of FIGS. 4-6. Further, the fuel injection timings may be provided via the method of FIG. 8 in cooperation with the system of FIGS. 4-6. Vertical lines represent times of interest (e.g., T40-T43) during the respective sequence plots.

The first plot from the top of FIGS. 7E-7H represents cylinder stroke of cylinder number one of an engine. The horizontal axis is broken into a series of segments that identify the cylinder stroke that cylinder number one is on as time proceeds from the left side of the figure to the right side of the figure. Expansion/exhaust stroke is abbreviated EXP while the compression stroke is abbreviated by COMP. The * indicates the beginning of combustion for the illustrated four stroke cylinder cycle. Thus, FIG. 7E shows a progression of a cylinder cycle over time. Thus, fuel injection for a cycle (e.g., one revolution) of a two stroke cylinder number one is shown.

The second plot from the top of FIGS. 7E-7H represents fuel injection timing during a cylinder cycle for fuel injector number one (e.g., a low flow fuel injector such as 424 shown in FIG. 4), which injects diesel fuel into cylinder number one. The pulse widths (e.g., 750, 754, 756, and 758) vary in width and the width is an indication of an amount of fuel injected in the fuel pulse. The wider the pulse is the larger the amount of fuel that is injected into the cylinder during the pulse.

The third plot from the top of FIGS. 7E-7H represents fuel injection timing during a cylinder cycle for fuel injector number two (e.g., a higher flow fuel injector such as 414 shown in FIG. 4), which injects diesel fuel into cylinder number one. The pulse widths (e.g., 756) vary in width and the width is an indication of an amount of fuel injected in the fuel pulse. The wider the pulse is the larger the amount of fuel that is injected into the cylinder during the pulse. The shorter the pulse is the smaller the amount of fuel that is injected into the cylinder during the pulse.

FIG. 7E shows example fuel injection timing where the lower flow fuel injector supplies fuel to the engine cylinder for pilot injections and post injections. Pilot injections are short duration fuel injections that are less than a threshold amount of time (e.g., less than 1 millisecond). The pilot fuel injections may reduce engine combustion noise, control peak cylinder pressures, and adjust heat release within the cylinder. Post injections are fuel injections that are preformed after combustion of the main fuel injection pulse is complete and before the piston passes the exhaust port during the expansion/exhaust stroke of the cylinder receiving the fuel during the cylinder cycle. The post injections may be useful for regenerating emissions control devices in the engine's exhaust system. FIG. 7E provides a main fuel injection pulse 756 via the higher flow fuel injector. The main fuel injection pulse 756 may provide significant chemical energy to meet a driver demand torque.

At the time T40, the engine is operating at a middle level engine load (not shown) and a first pilot fuel injection 750 begins via fuel injector number one. The first pilot fuel injection 750 is provided during the compression stroke of cylinder number one. Shortly thereafter, the first pilot fuel injection ends. The low flow rate fuel injector may be configured with less moving mass (e.g., the low flow fuel injector pintle may include less mass) so that it makes it possible to open and close the low fuel flow injector in a shorter time than the higher flow fuel injector. Further, the low flow fuel injector may inject smaller masses of fuel more accurately than the higher flow fuel injector. As such, the low flow fuel injector may be suited for providing pilot fuel injections. The second higher flow fuel injector is not injecting fuel.

At time T41, a second pilot fuel injection 754 begins via the first fuel injector. The second pilot fuel injection 754 is provided during the compression stroke of cylinder number one. Shortly thereafter, the second pilot fuel injection ends.

At time T42, a main fuel injection 756 begins via the second fuel injector. The main fuel injection 756 may be provided during the compression stroke of cylinder number one after the cylinder passes the exhaust port. The main fuel injection pulse ends before top-dead-center compression stroke. The first fuel injector is not injecting fuel to cylinder number one.

At time T43, a first post fuel injection 758 begins. The first post fuel injection is provided via the first fuel injector. The second fuel injector is not injecting fuel. Shortly after time T43, the first post fuel injection ends and fuel delivery to cylinder number one for the illustrated cylinder cycle ends. In other examples, additional or fewer post fuel injections and pilot fuel injections may be provided.

In this way, the low flow fuel injector may supply the smaller fuel amounts for pilot and post fuel injections. Larger fuel injection amounts may be provided by the higher flow fuel injector. Thus, the fuel injections may be allocated between the two different fuel injectors in a way that improves accuracy of pilot fuel injection amounts, post fuel injection amounts, and main fuel injection amount.

FIG. 7F shows second example fuel injection timing where the lower flow fuel injector supplies fuel to the engine cylinder for pilot injections, a main injection, and post injections. Main fuel injections are longer duration fuel injections that are greater than a threshold amount of time (e.g., greater than 1 milliseconds). The lower flow fuel injector may provide a main fuel injection at higher engine speeds and loads when the higher flow fuel injector lacks time to provide a sufficient amount of fuel to meet cylinder air-fuel requirements. FIG. 7F also provides a main fuel injection pulse via the higher flow fuel injector. The two main fuel injection pulses may provide significant chemical energy to meet a driver demand torque.

At the time T44, the engine is operating at a higher level engine load (not shown) and a first pilot fuel injection begins via fuel injector number one. The first pilot fuel injection 760 begins during the compression stroke of cylinder number one. Shortly thereafter, the first pilot fuel injection ends. The second higher flow fuel injector is not injecting fuel.

At time T45, a second pilot fuel injection 762 begins via the first fuel injector. The second pilot fuel injection 762 is provided during the compression stroke of cylinder number one. Shortly thereafter, the second pilot fuel injection ends. The second fuel injector is not supplying fuel to cylinder number one.

At time T46, a main fuel injection 764 begins via the first fuel injector. The main fuel injection is provided during the compression stroke of cylinder number one. The first fuel injector may provide a main fuel injection so that a desired engine air-fuel ratio may be provided.

At time T47, a main fuel injection 766 begins via the second fuel injector. The main fuel injection 766 is provided during the compression stroke of cylinder number one. The main fuel injection 764 provided via the first fuel injector and the main fuel injection 766 provided via the second fuel injector overlap. The overlap may be useful to reduce the possibility of injected fuel impinging on cylinder walls.

At time T48, the main fuel pulse 764 provided via the first fuel injector and the main fuel pulse 766 provided via the second fuel injector end. The main fuel injection pulses may end simultaneously to improve engine emissions and regulate heat release during combustion. Further, by simultaneously ceasing fuel injection via the first and second fuel injectors, the possibility of fuel impinging on cylinder walls may be reduced.

At time T48, a first post fuel injection is provided. The first post fuel injection is provided via the first fuel injector. Shortly thereafter, the first post fuel injection ends and fuel delivery to cylinder number one for the illustrated cylinder cycle ends.

In this way, the low flow fuel injector may supply the smaller fuel amounts for pilot and post fuel injections. Further, a main fuel injection by the second fuel injector may be augmented by a main fuel injection from the first fuel injector. Thus, the fuel injections may be allocated between the two different fuel injectors in a way that improves accuracy of pilot fuel injection amounts and increases fuel supplied to meet higher engine loads. In other examples, additional or fewer post fuel injections and pilot fuel injections may be provided.

FIG. 7G shows third example fuel injection timing where the first fuel injector and the second fuel injector alternate pilot injections and post injections. Main fuel injections are also provided via the first and second fuel injector. The lower flow fuel injector may provide a main fuel injection at higher engine speeds and loads when the higher flow fuel injector lacks time to provide a sufficient amount of fuel to meet cylinder air-fuel requirements. The pilot fuel injections may be alternated between the first and second fuel injectors to allow moving masses within the injectors to settle to a desired position (e.g., closed) and to allow electrical/magnetic components (e.g., coils) to a achieve a desired state (e.g., magnetic field strength less than a threshold) before the fuel injectors are reactivated. Thus, the amount of time between when a fuel injector ends injection and begins a new injection during a cycle of a cylinder may be increased to improve fuel delivery accuracy and repeatability. Further, the amount of time between an end of a first pilot injection in a cylinder cycle and a beginning of a second pilot fuel injection in the cylinder cycle may be reduced because the fuel injectors are less constrained by each fuel injectors off dwell time. The two main fuel injection pulses may provide significant chemical energy to meet a driver demand torque.

At the time T50, the engine is operating at part engine load (not shown) and a first pilot fuel injection 770 begins via fuel injector number one. The first pilot fuel injection 770 begins during the compression stroke of cylinder number one. Shortly thereafter, the first pilot fuel injection ends. The second higher flow fuel injector is not injecting fuel.

At time T51, a second pilot fuel injection 772 begins via the second fuel injector. The second pilot fuel injection 772 is provided during the compression stroke of cylinder number one. Shortly thereafter, the second pilot fuel injection ends. The first fuel injector is not supplying fuel to cylinder number one.

At the time T52, a third pilot fuel injection 771 begins via fuel injector number one. The third pilot fuel injection 771 begins during the compression stroke of cylinder number one. Shortly thereafter, the third pilot fuel injection ends. The second higher flow fuel injector is not injecting fuel.

At time T53, a fourth pilot fuel injection 773 begins via the second fuel injector. The fourth pilot fuel injection 773 is provided during the compression stroke of cylinder number one. Shortly thereafter, the fourth pilot fuel injection ends. The first fuel injector is not supplying fuel to cylinder number one.

At time T54, main fuel injections 775 and 776 begin via the first fuel injector and the second fuel injector. The main fuel injection is provided during the compression stroke of cylinder number one. The first fuel injector and the second fuel injector may provide main fuel injections so that a desired engine air-fuel ratio may be provided.

At time T55, the main fuel pulse 775 provided via the first fuel injector and the main fuel pulse 776 provided via the second fuel injector end. The main fuel injection pulses may end simultaneously to improve engine emissions and regulate heat release during combustion. Further, by simultaneously ceasing fuel injection via the first and second fuel injectors, the possibility of fuel impinging on cylinder walls may be reduced.

At time T56, a first post fuel injection begins. In this example, the post fuel injection is late. The first post fuel injection is provided via the first fuel injector. Shortly thereafter, the first post fuel injection ends.

At time T57, a second post fuel injection begins. The second post fuel injection is provided via the second fuel injector. Shortly thereafter, the second post fuel injection ends.

At time T58, a third post fuel injection is provided. The third post fuel injection is provided via the first fuel injector. Shortly thereafter, the third post fuel injection ends and fuel delivery to cylinder number one for the illustrated cylinder cycle ends. Thus, post fuel injections may be alternated between the first fuel injector and the second fuel injector to allow operation of mechanical and electrical/magnetic components of the fuel injector to stabilize to improve fuel delivery accuracy.

Alternating pilot and post fuel injections may also be useful when the flow rates of the first and second fuel injectors are equal or different. In this way, a short recovery time between fuel injections may be provided for each fuel injector of the engine. Further, a main fuel injection by the second fuel injector may be augmented by a main fuel injection from the first fuel injector. Thus, the fuel injections may be allocated between the two different fuel injectors in a way that improves accuracy of pilot fuel injection amounts and increases fuel supplied to meet higher engine loads. Additionally, injecting fuel with two fuel injectors allows fuel to be injected via a second fuel injector shortly after a first injector ceases to inject fuel such that the second fuel injector injects during an off dwell time of the first fuel injector. This allows closer coupling of injections, which may improve engine noise reduction and emissions.

FIG. 7H shows fourth example fuel injection timing where the lower flow fuel injector (e.g., fuel injector number one) supplies fuel to the engine cylinder for a main injection and a post injection. The lower flow fuel injector may provide one or two main fuel injections at higher engine speeds and loads so that the pressure rise in the cylinder may be controlled and limited with early start of injection for the main fuel pulse. FIG. 7D also provides pilot fuel injections and a main fuel injection pulse via the higher flow fuel injector (e.g., fuel injector number two). The second fuel injector may supply pilot fuel injections at higher engine loads when the second fuel injector is a higher flow fuel injector. The three main fuel injection pulses may provide significant chemical energy to meet a driver demand torque.

At the time T60, the engine is operating at a higher level engine load (not shown) and a first pilot fuel injection begins via fuel injector number two. The first pilot fuel injection 792 begins during the compression stroke of cylinder number one. Shortly thereafter, the first pilot fuel injection ends. The first lower flow fuel injector is not injecting fuel at time T60.

At time T61, a second pilot fuel injection 793 begins via the second fuel injector. The second pilot fuel injection 793 is provided during the compression stroke of cylinder number one. Shortly thereafter, the second pilot fuel injection ends. The first fuel injector is not supplying fuel to cylinder number one at time T61.

At time T62, a main fuel injection 790 begins via the first fuel injector. The main fuel injection 790 is provided during the compression stroke of cylinder number one. The first fuel injector may provide a main fuel injection so that a desired engine air-fuel ratio may be provided. Further, combustion heat release may be controlled to provide slower heat release when the first fuel injector is a lower flow fuel injector as compared to if the first fuel injector is a higher flow fuel injector.

At time T63, a main fuel injection 794 begins via the second fuel injector. The main fuel injection 794 is provided during the compression stroke of cylinder number one. The main fuel injection 790 provided via the first fuel injector and the main fuel injection 794 provided via the second fuel injector overlap. The overlap may be useful to reduce the possibility of injected fuel impinging on cylinder walls and it may also increase heat release within the cylinder. The main fuel injection pulses end early in the expansion stroke.

At time T64, a first post fuel injection is provided. The first post fuel injection is provided via the first fuel injector since only a small fuel injection amount is desired. Shortly thereafter, the first post fuel injection ends and fuel delivery to cylinder number one for the illustrated cylinder cycle ends.

In this way, the higher flow fuel injector may supply the pilot fuel injections at higher engine loads when larger pilot fuel injection amounts may be desired. Further, a main fuel injection by the second fuel injector may be augmented by a main fuel injection from the first fuel injector. Thus, the fuel injections may be allocated between the two different fuel injectors in a way that improves accuracy of pilot fuel injection amounts and increases fuel supplied to meet higher engine loads. In other examples, additional or fewer post fuel injections and pilot fuel injections may be provided.

Referring now to FIG. 8, a method for adjusting fuel injection timing is shown. The method of FIG. 8 may be stored as executable instructions in non-transitory memory in systems such as shown in FIGS. 1-6. A flowchart of a method for adjusting fuel injection timing of an internal combustion engine is shown. The method of FIG. 8 may be incorporated into and may cooperate with the systems of FIGS. 1-6. Further, at least portions of the method of FIG. 8 may be incorporated as executable instructions stored in non-transitory memory while other portions of the method may be performed via a controller transforming operating states of devices and actuators in the physical world. The controller may employ engine actuators of the engine system to adjust engine operation, according to the methods described below.

At 802, method 800 determines engine operating conditions. Engine operating conditions may include but are not limited to engine temperature, accelerator pedal position, and engine speed. Engine operating conditions may be determined via engine sensors and the engine controller. Method 800 proceeds to 804.

At 804, method 800 determines driver demand torque. In one example, method 800 determines driver demand torque via indexing or referencing a table or function that holds empirically determined values of driver demand torque. The table or function may be indexed or referenced via engine speed and accelerator pedal position. The table outputs a driver demand torque. Method 800 proceeds to 806.

At 806, method 800 determines an amount of fuel to inject to a cylinder during a cycle of the cylinder. In one example, the amount of fuel amount to inject to a cylinder during a cycle of the cylinder may be determined via indexing or referencing a table of empirically determined fuel amounts. The table may be referenced via driver demand torque and engine speed. The table outputs an empirically determined amount of fuel to inject during a cycle of the cylinder. Method 800 proceeds to 808.

At 808, method 800 determines pilot and main fuel injection amounts. In one example, the amount of fuel to inject during the cycle of the cylinder determined at 806 is partitioned into pilot fuel injection amount and main fuel injection amount. In particular, a fraction of the amount of fuel to be injected to a cylinder during a cylinder cycle is output from a table or function of empirically determined pilot fuel injection fractions. The table or function may be referenced via engine speed and driver demand torque. The main fuel injection amount is the amount of fuel determined at 806 minus the predetermined amount of fuel allocated to pilot fuel injection during the cylinder cycle. For example, if X grams of fuel are to be injected into a cylinder during a cycle of the cylinder and 10% of the X grams of fuel are to be pilot injected, the main fuel injection amount is X−(X·0.1) or 90% of X.

Alternatively, a predetermined amount of fuel may be allocated to pilot fuel injection during a cylinder cycle. The predetermined amount may be empirically determined and stored in a table or function. The table or function may be referenced via engine speed and driver demand torque. The table outputs a predetermined amount of fuel to be pilot injected. The main fuel injection amount is the amount of fuel determined at 806 minus the predetermined amount of fuel allocated to pilot fuel injection during the cylinder cycle. Method 800 proceeds to 810.

At 810, method 800 determines an actual total number of pilot fuel injections during a cycle of a cylinder. In one example, a table or function holds values of total numbers of pilot fuel injections to provide to a cylinder during a cycle of the cylinder. The values may be empirically determined. The table or function may be indexed or referenced via engine speed and driver demand torque. The amount of pilot fuel to be injected may be divided by the actual total number of pilot fuel injections to determine the amount of fuel in each pilot fuel injection. Alternatively, the amount of fuel in each pilot injection may be a fraction of the amount of pilot injection fuel determined at 808. Method 800 proceeds to 812.

At 812, method 800 determines an actual total number of main fuel injections during a cycle of a cylinder. In one example, a table or function holds values of total numbers of main fuel injections to provide to a cylinder during a cycle of the cylinder. The values may be empirically determined. The table or function may be indexed or referenced via engine speed and driver demand torque. The actual total number of main fuel injections may be a value of one or two when the cylinder is fueled during a cylinder cycle. The amount of main injection fuel to be injected may be divided by the actual total number of main fuel injections to determine the amount of fuel in each main fuel injection. Alternatively, the amount of fuel in each main injection may be a fraction of the amount of main injection fuel determined at 808. Method 800 proceeds to 812.

At 814, method 800 determines an amount of post combustion fuel to inject to a cylinder during a cycle of the cylinder. In one example, the amount of post combustion fuel to inject to a cylinder during a cycle of the cylinder may be determined via indexing or referencing a table of empirically determined post combustion fuel injection amounts. The table may be referenced via catalyst temperature and engine air flow amount. The table outputs an amount of fuel to inject post combustion in the cylinder during a cycle of the cylinder. Further, method 800 may determine an actual total number of post fuel injections from a table or function that holds empirically determined number of post fuel injections. The table or function may be referenced via engine speed and driver demand torque. The amount of fuel injected in each post combustion fuel injection may be the post fuel injection amount for a cylinder cycle divided by the actual total number of post combustion injections during the cylinder cycle. Method 800 proceeds to 816.

At 816, method 800 determines timing for the pilot fuel injections, the main fuel injections, and the post fuel injections. In one example, the start of injection timing for the pilot injection are empirically determined and stored in a table or function. The table or function is referenced by engine speed and driver demand torque. The table or function outputs a start of pilot injection time in engine crankshaft degrees. The pilot fuel injection begins at the start of pilot fuel injection time. Similarly, the start of injection timing for the main and post combustion injections are empirically determined and stored in tables or functions. The tables or functions are referenced by engine speed and driver demand torque. The tables or functions output a start of main injection time and start of post combustion injection time in engine crankshaft degrees. The main and post combustion fuel injections begin at the respective start of injection times. Alternatively, method 800 may determine end of injection times for the pilot, main, and post combustion injections. The start of injection time is then determined from injector flow rate, engine of injection time, and amount of fuel injected.

Method 800 also assigns injections to each of the fuel injectors. In one example, assignments of which fuel injectors inject pilot, main, and post injections may be empirically determined and stored in a table or function. The fuel injector assignments are output from the tables or functions and the tables or functions may be indexed or referenced via engine speed and driver demand torque. For example, at lower engine speeds and loads, the table may assign a lower flow rate fuel injector to output pilot fuel injections and main fuel injections. At middle level engine speeds and loads, the table or function may assign the lower flow rate fuel injector to output pilot fuel injections and a higher rate fuel injector to output main pulse injections. The table may also assign post combustion injections to the lower flow rate fuel injector. At higher engine speeds and loads, the table or function may assign the higher flow rate fuel injector to output pilot fuel injections and main pulse injections. The table or function may also assign alternating pilot and main injections between lower and higher flow rate injectors as shown in FIGS. 7A-7H. The table or function may provide all of the fuel injector assignments described in FIGS. 7A-7H and combinations of the same.

Alternatively, assignment of which fuel injector injects fuel may be based on the amount of fuel being injected in pilot, main, and port injections. For example, if the amount of fuel to be delivered as pilot injection fuel is less than or equal to a threshold, a lower flow rate fuel injector may be assigned to inject pilot fuel. If the amount of fuel to be delivered as pilot injection fuel is greater than the threshold, a higher flow rate fuel injector may be assigned to inject pilot fuel. Similarly, if the amount of fuel to be delivered as main injection fuel is less than or equal to a threshold, a lower flow rate fuel injector may be assigned to inject main pulse fuel. If the amount of fuel to be delivered as main injection fuel is greater than the threshold, a higher flow rate fuel injector may be assigned to inject main pulse fuel. Likewise, if the amount of fuel to be delivered as post combustion injection fuel is less than or equal to a threshold, a lower flow rate fuel injector may be assigned to inject post combustion fuel. If the amount of fuel to be delivered as post combustion injection fuel is greater than the threshold, a higher flow rate fuel injector may be assigned to inject post combustion fuel. Method 800 proceeds to 818.

At 818, method 800 injects the pilot, main, and post fuel injection amounts. The fuel may be injected via lower and higher flow rate fuel injectors. Alternatively, in some examples, the fuel injectors may have substantially the same flow rates (e.g., flow rates within 2% of each other). Method 800 proceeds to exit.

The method of FIG. 8 may be performed for each engine cylinder so that a plurality of engine cylinders may be supplied fuel via dual diesel fuel injectors. Further, each engine cylinder may be assigned unique fuel injection timings if desired.

Referring now to FIG. 9, a plot of a cylinder cycle showing close coupled pilot and post fuel injections during a cylinder cycle according to the method of FIG. 8 is shown. The sequence of FIG. 9 may be provided via the systems shown in FIGS. 1-6. FIG. 9 shows fuel injection timing diagrams for the four stroke engine or a two stroke engine. The fuel injection timings may be provided via the controllers and fuel injectors described herein. Vertical lines represent times of interest (e.g., T70-T86) during the respective sequence plots.

The first plot from the top of FIG. 9 represents cylinder stroke of cylinder number one of an engine. The horizontal axis is broken into a series of segments that identify the cylinder stroke that cylinder number one is on as time proceeds from the left side of the figure to the right side of the figure. Compression stroke is abbreviated as COMP and expansion stroke is abbreviated as EXP. The * indicates the beginning of combustion for the illustrated cylinder cycle.

The second plot from the top of FIG. 9 represents fuel injection timing during a cylinder cycle for fuel injector number one (e.g., a low flow fuel injector such as 69 shown in FIG. 1), which injects diesel fuel into cylinder number one. The pulse widths (e.g., 901 and 903) vary in width and the width is an indication of an amount of fuel injected in the fuel pulse. The wider the pulse is the larger the amount of fuel that is injected into the cylinder during the pulse. Wide lines 998 represent an injector off dwell time during which fuel injector number one cannot open to inject fuel after being recently closed. The fuel injector off dwell time may be related to physical properties of fuel injector number one and/or driver circuitry.

The third plot from the top of FIG. 9 represents fuel injection timing during a cylinder cycle for fuel injector number two (e.g., a high flow fuel injector such as 69 shown in FIG. 1), which injects diesel fuel into cylinder number one. The pulse widths (e.g., 906 and 908) vary in width and the width is an indication of an amount of fuel injected in the fuel pulse. The wider the pulse is the larger the amount of fuel that is injected into the cylinder during the pulse. The shorter the pulse is the smaller the amount of fuel that is injected into the cylinder during the pulse. Wide lines 999 represent an injector off dwell time during which fuel injector number two cannot open to inject fuel after being recently closed. The fuel injector off dwell time may be related to physical properties of fuel injector number two and/or driver circuitry.

At time T70 fuel injector begins to inject a first pilot fuel injection 901 during the cylinder cycle. Fuel injector number two is not injecting fuel. Fuel injector number one ceases to inject fuel at time T71 and the injector off dwell time 998 for fuel injector number one begins. At time T72, the fuel injector number two begins to inject a second pilot fuel injection 906 during the fuel injection off dwell time of fuel injector number one. Fuel injector number two ceases to inject fuel at time T73 and its off dwell time 999 begins. Fuel injector number one provides a third pilot fuel injection 902 at time T74 while the off dwell time of fuel injector number two is in progress. The third pilot fuel injection provided by fuel injector number one ceases at time T75. Fuel injector number two begins a fourth pilot injection 907 at time T76 when the off dwell time of fuel injector number one is active. Thus, by staggering fuel injection times of two fuel injectors, it is possible to provide pilot fuel injections that are closer together than would be possible by using a single fuel injector.

Between time T76 and time T80, fuel injector number one and fuel injector number two each provide main fuel injections and their respective off dwell times follow the main fuel injections. The off dwell times end well before the post fuel injections begin at time T80.

At time T80 fuel injector begins to inject a first post fuel injection 904 during the cylinder cycle. Fuel injector number two is not injecting fuel. Fuel injector number one ceases to inject fuel at time T81 and the injector off dwell time 998 for fuel injector number one begins. At time T82, the fuel injector number two begins to inject a second post fuel injection 909 during the fuel injection off dwell time of fuel injector number one. Fuel injector number two ceases to inject fuel at time T83 and its off dwell time 999 begins. Fuel injector number one provides a third post fuel injection 905 at time T84 while the off dwell time of fuel injector number two is in progress. The third pilot fuel injection provided by fuel injector number one ceases at time T85. Fuel injector number two begins a fourth post injection 910 at time T86 when the off dwell time of fuel injector number one is active. Thus, by staggering fuel injection times of two fuel injectors, it is possible to provide post fuel injections that are closer together than would be possible by using a single fuel injector.

In addition, main injections by one injector may be started during an off dwell time of the other injector after the other injector has completed a pilot fuel injection so that main fuel injections may be closely coupled to pilot fuel injections. For example, a main injection from fuel injector number two may start during an off dwell time of fuel injector number one after fuel injector number one completes a pilot fuel injection. Likewise, post fuel injections by one injector may be started during an off dwell time of the other injector after the other injector has completed a main fuel injection so that post fuel injections may be closely coupled to main fuel injections. For example, a post injection from fuel injector number one may start during an off dwell time of fuel injector number two after fuel injector number two completes a main fuel injection.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine system, comprising:
    an engine including at least one cylinder and two pistons positioned within the at least one cylinder;
    a first diesel fuel injector supplying fuel to the at least one cylinder;
    a second diesel fuel injector supplying fuel to the at least one cylinder, the second diesel fuel injector a higher fuel flow rate injector than the first diesel fuel injector; and
    a cavity in a first of the two pistons, where the cavity is asymmetric about a horizontal centerline of the cavity, and where a first opening width of the cavity is less than a second opening width of the cavity.

2. An engine system, comprising:
an opposed piston engine including at least one cylinder and two pistons positioned within the at least one cylinder;
a first diesel fuel injector supplying diesel fuel to the at least one cylinder;
a second diesel fuel injector supplying diesel fuel to the at least one cylinder, the second diesel fuel injector a higher fuel flow rate injector than the first diesel fuel injector; and
a cavity in a first of the two pistons, where the cavity is asymmetric about a horizontal centerline of the cavity, and where a first opening width of the cavity is less than a second opening width of the cavity.

3. The engine system of claim 2, where a depth of the cavity is non-uniform.

4. The engine system of claim 2, where the first and second diesel fuel injectors are positioned directly opposed to each other.

5. The engine system of claim 2, where the horizontal centerline is perpendicular to longitudinal directions of the first and second diesel fuel injectors.

6. The engine system of claim 5, where the cavity includes three sidewalls.

7. The engine system of claim 1, wherein the first opening width of the cavity is positioned between the first diesel fuel injector and the horizontal centerline.

8. The engine system of claim 7, wherein the first diesel fuel injector has a narrower fuel spray cone than the second diesel fuel injector.

9. The engine system of claim 1, wherein the second opening width of the cavity is positioned between the second diesel fuel injector and the horizontal centerline.

10. The engine system of claim 1, wherein the horizontal centerline is perpendicular to a vertical centerline, and wherein the cavity is symmetrical about the vertical centerline.

11. The engine system of claim 10, wherein the first diesel fuel injector and the second diesel fuel injector are positioned directly opposed to each other.

12. The engine system of claim 2, wherein the first opening width of the cavity is positioned between the first diesel fuel injector and the horizontal centerline.

13. The engine system of claim 12, wherein the second opening width of the cavity is positioned between the second diesel fuel injector and the horizontal centerline.

14. The engine system of claim 13, wherein the second diesel fuel injector has a wider spray cone than the first diesel fuel injector.

\* \* \* \* \*